United States Patent
Foerster et al.

(10) Patent No.: US 11,816,089 B2
(45) Date of Patent: Nov. 14, 2023

(54) SUPPORTING REPORTABILITY OF INTERNET OF THINGS (IOT) DATA IN THE CLOUD FOR ENTERPRISE CONTEXTS

(71) Applicant: SAP SE, Walldorf (DE)

(72) Inventors: Theodor Foerster, Mannheim (DE); Markus Winkler, Eppingen (DE); Philip Transfeld, Mannheim (DE); Tom Kiemes, Karlsruhe (DE); Stefan Weidemueller-Schmidt, Dielheim (DE)

(73) Assignee: SAP SE, Walldorf (DE)

(*) Notice: Subject to any disclaimer, the term of this patent is extended or adjusted under 35 U.S.C. 154(b) by 440 days.

(21) Appl. No.: 16/525,761

(22) Filed: Jul. 30, 2019

(65) Prior Publication Data

US 2021/0034601 A1 Feb. 4, 2021

(51) Int. Cl.
| | | |
|---|---|---|
| G06F 16/00 | (2019.01) | |
| G06F 16/23 | (2019.01) | |
| G06F 16/2458 | (2019.01) | |
| H04L 67/10 | (2022.01) | |
| H04L 67/12 | (2022.01) | |

(52) U.S. Cl.
CPC ...... *G06F 16/2365* (2019.01); *G06F 16/2477* (2019.01); *H04L 67/10* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 9,270,629 | B2* | 2/2016 | Eichinger | H04L 51/48 |
| 9,553,918 | B1* | 1/2017 | Manion | G06F 16/40 |
| 9,665,593 | B2* | 5/2017 | Chen | H04L 67/1095 |
| 10,628,079 | B1* | 4/2020 | Li | G06F 12/0862 |
| 10,956,423 | B2* | 3/2021 | Singh | G06F 16/24568 |
| 11,126,612 | B2* | 9/2021 | Gaber | G06F 16/25 |
| 11,366,842 | B1* | 6/2022 | Swaminathan | G06F 17/18 |
| 2004/0117358 | A1* | 6/2004 | von Kaenel | G06F 16/29 |
| 2007/0061393 | A1* | 3/2007 | Moore | H04L 67/02 |
| | | | | 709/201 |
| 2014/0297589 | A1* | 10/2014 | Chen | G06F 16/275 |
| | | | | 707/624 |
| 2016/0055172 | A1* | 2/2016 | Chen | G06F 16/178 |
| | | | | 707/625 |
| 2016/0217384 | A1* | 7/2016 | Leonard | G06N 5/022 |
| 2016/0379168 | A1* | 12/2016 | Foerster | G06Q 10/063116 |
| | | | | 705/7.16 |
| 2016/0381025 | A1* | 12/2016 | Foerster | H04L 63/0807 |
| | | | | 726/4 |
| 2017/0295231 | A1* | 10/2017 | Clemm | H04L 67/06 |

(Continued)

OTHER PUBLICATIONS

1 Non-Final Office Action issued in U.S. Appl. No. 16/525,760 dated Feb. 19, 2021, 14 pages.

*Primary Examiner* — Farhan M Syed
(74) *Attorney, Agent, or Firm* — Fish & Richardson P.C.

(57) ABSTRACT

Methods, systems, and computer-readable storage media for selective use of Internet-of-Things (IoT) data in data analytics systems. Implementations include receiving IoT data from an IoT device, determining that hardening is to be applied to the IoT data, comparing a timestamp of the IoT data to a hardening value, and in response to comparing, selectively using the IoT data in one or more uses by the data analytics system.

20 Claims, 6 Drawing Sheets

(56) References Cited

U.S. PATENT DOCUMENTS

| | | | |
|---|---|---|---|
| 2018/0025023 A1* | 1/2018 | Chen | G06F 16/00 707/625 |
| 2019/0138524 A1* | 5/2019 | Singh | H04L 43/18 |
| 2020/0012541 A1* | 1/2020 | Lube | G06F 9/542 |
| 2020/0334253 A1* | 10/2020 | El Kaed | G06F 16/36 |
| 2021/0034619 A1* | 2/2021 | Foerster | H04L 67/566 |
| 2021/0240719 A1* | 8/2021 | Singh | H04L 67/12 |

* cited by examiner

SUPPORTING REPORTABILITY OF INTERNET OF THINGS (IOT) DATA IN THE CLOUD FOR ENTERPRISE CONTEXTS

CROSS-REFERENCE TO CO-PENDING AND RELATED APPLICATION

This application is a co-pending application of, and filed in conjunction with, U.S. patent application Ser. No. 16/525,760, filed on Jul. 30, 2019, now issued as U.S. Pat. No. 11,055,299, issued on Jul. 6, 2021, entitled "SUPPORTING REPORTABILITY OF INTERNET OF THINGS (IOT) DATA IN THE CLOUD FOR ENTERPRISE CONTEXTS", the entire contents of each and as a whole are incorporated herein by reference.

BACKGROUND

The Internet of Things (IoT) is a network of physical objects, or "things," embedded within electronics, software, sensors, and connectivity to enable and achieve greater value and service by exchanging data with the manufacturer, operator, and/or other connected devices or systems. The IoT provides application gateways for data aggregation and distribution that are located between application servers and numerous devices. An example application of IoT includes predictive maintenance, in which systems and sub-systems are monitored using IoT devices, and a goal can include detecting potential failure of machines and/or components. Predicting failure is based on observations (sensor data) occurring before the failure critically affects the whole machine and causes a breakdown.

IoT can be described as an enabler of intelligent enterprises and an important asset to fuel artificial intelligence (AI). For example, an IoT network can provide data (in real-time) that is processed using, for example, AI, to make intelligent decisions in the enterprise context (e.g., enterprise operations). In some instances, IoT data is initially provided as raw time-series data, which needs to be structured and analyzed in a way that information can be extracted and used to help in decision-making processes. For example, IoT data is used to drive decisions in various domains such as fleet management, predictive maintenance, and the like. Further, IoT-generated data can be provided as the input for highly standardized and partially regulated processes (e.g., financial reporting, usage reporting, predictive maintenance). These processes lead to decisions, which can have a ripple effect influencing other areas (e.g., the stock market).

Many of the domains that leverage IoT data require high-value information, which is generated out of the raw data. This information also needs to be accessible in a fast and efficient way, with a low total cost of ownership (TCO). Examples of high-value information include, without limitation, events, notifications, and data aggregates. In some instances, there can be a discrepancy between the requirements of processes that rely on IoT data and the actual reliability of the IoT data. One of the sources for this lack of reliability of IoT data is the unpredictable order or a delayed arrival of incoming IoT data.

SUMMARY

Implementations of the present disclosure provide solutions for addressing delays in IoT data and provide a process and data structure to reflect data occurrences with a start date and an end date. More particularly, implementations of the present disclosure are directed to a mechanism for hardening timespans and/or hardening timestamps to handle delays of IoT data and improve reliability of results generated based on the IoT data. Further, implementations of the present disclosure also provide a highly configurable mechanism to provide segments of IoT data based on different types of timeseries data being sent to a process by detecting a start and/or an end of a segment within the timeseries data.

In some implementations, actions include receiving IoT data from an IoT device, determining that hardening is to be applied to the IoT data, comparing a timestamp of the IoT data to a hardening value, and in response to comparing, selectively using the IoT data in one or more uses by the data analytics system. Other implementations of this aspect include corresponding systems, apparatus, and computer programs, configured to perform the actions of the methods, encoded on computer storage devices.

These and other implementations can each optionally include one or more of the following features: the hardening value includes a hardening timestamp and the IoT data is not used in the one or more uses by the data analytics system when the timestamp exceeds the hardening timestamp; the hardening value includes a hardening timespan and the IoT data is not used in the one or more uses by the data analytics system when the timestamp is not within the hardening timespan; the hardening timespan is relative to a current time; actions further include determining one or more of a type of the IoT data and a use of the IoT data, wherein determining that hardening is to be applied to the IoT data is at least partially based on one or more of the type of the IoT data and the use of the IoT data; the IoT data is not used for at least one use and is used for another use; and the IoT data is received in real-time and determining that the hardening is to be applied to the IoT data is executed in response to the receiving the IoT data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure provide solutions for addressing delays in Internet-of-Things (IoT) data and provide a process and data structure to reflect data occurrences with a start date and an end date. More particularly, implementations of the present disclosure are directed to a mechanism for hardening timespans and/or hardening timestamps to handle delays of IoT data and improve reliability of results generated based on the IoT data. Further, implementations of the present disclosure also provide a highly configurable mechanism to provide segments of IoT data based on different types of timeseries data being sent to a process by detecting a start and/or an end of a segment within the timeseries data. Implementations can include actions of receiving IoT data from an IoT device, determining that hardening is to be applied to the IoT data, comparing a timestamp of the IoT data to a hardening value, and in response to comparing, selectively using the IoT data in one or more uses by the data analytics system.

To provide further context for implementations of the present disclosure, and as introduced above, IoT is a network of physical objects, or "things," embedded within electronics, software, sensors, and connectivity to enable and achieve greater value and service by exchanging data with the manufacturer, operator, and/or other connected devices or systems. An IoT network provides application gateways for data aggregation and distribution that are located between application servers and numerous devices. An example application of IoT includes predictive maintenance, in which systems and sub-systems are monitored using IoT devices, and a goal can include detecting potential failure of machines and/or components. Predicting failure is based on observations (sensor data) occurring before the failure critically affects the whole machine and causes a breakdown.

IoT can be described as an enabler of intelligent enterprises and an important asset to fuel artificial intelligence (AI). For example, an IoT network can provide data (in real-time) that is processed using, for example, AI, to make intelligent decisions in the enterprise context (e.g., enterprise operations). In some instances, IoT data is initially provided as raw time-series data, which needs to be structured and analyzed in a way that information can be extracted and used to help in decision-making processes. For example, IoT data is used to drive decisions in various domains such as fleet management, predictive maintenance, and the like. Further, IoT-generated data can be provided as the input for highly standardized and partially regulated processes (e.g., financial reporting, usage reporting, predictive maintenance). These processes lead to decisions, which can have a ripple effect influencing other areas (e.g., the stock market).

Many of the domains that leverage IoT data require high-value information, which is generated out of the raw data. This information also needs to be accessible in a fast and efficient way, with a low total cost of ownership (TCO). Examples of these high-value information are events and notifications or data aggregates. A process and a particular data structure are required to reflect data occurrences with a start and an end date (also referred to as a segment).

Further, there can be a discrepancy between the requirements of processes that rely on IoT data and the actual reliability of the IoT data. One of the sources for this lack of reliability of IoT data is the unpredictable order or a delayed arrival of incoming IoT data. The nature of the problem of delayed IoT data is that IoT data contains timestamps (extracted from the sensor readings), which need to be put in context with processes and can influence time-dependent decision making. Due to the underlying IoT protocols, a correct ordering of IoT data is not guaranteed. Further, due to unplanned delays and unpredictable connectivity issues, the IoT data of particular sensors can be received with a delay, whereas the data of other sensors has been received in real-time. In particular scenarios, this problem of ordering of data can lead to delays of incoming data, which are a major drawback for enterprise processes. Delays can lead to changes of data, which have already been included in reports or have already been archived. In enterprise operations, there are critical aspects of delays. For example, delays for a particular timespan (e.g. delay of a week) or delays until a certain timestamp (e.g., end of the month).

In view of the above context, implementations of the present disclosure provide solutions for addressing delays in IoT data and provide a process and data structure, as a segment, to reflect data occurrences with a start date and an end date. More particularly, implementations of the present disclosure are directed to a mechanism for hardening timespans and/or hardening timestamps to handle delays of IoT data and improve reliability of results generated based on the IoT data. Further, implementations of the present disclosure also provide a highly configurable mechanism to provide segments of IoT data based on different types of timeseries data being sent to a process by detecting a start and/or an end of a segment within the timeseries data.

Figure 1:
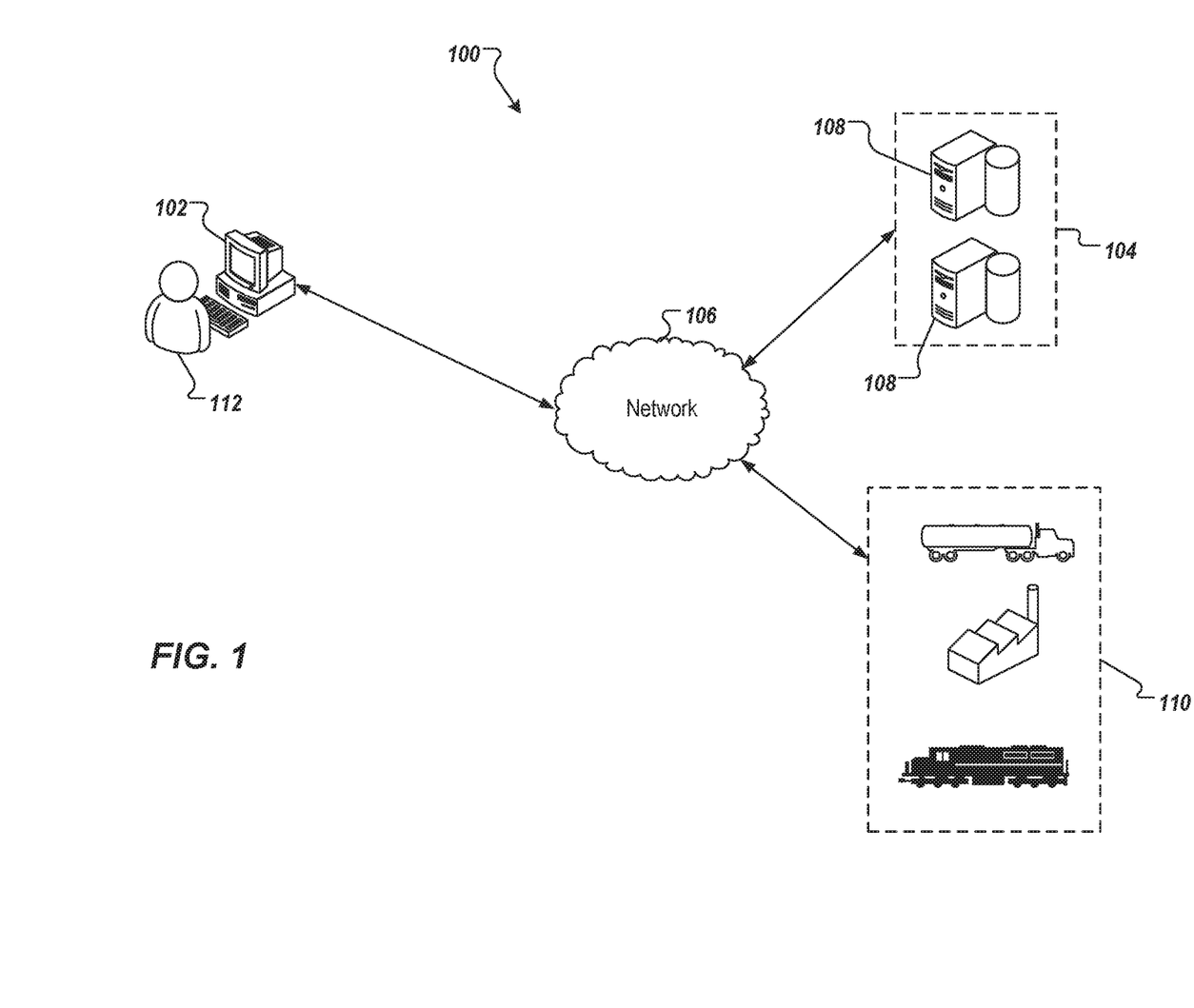
FIG. 1 depicts an example architecture that can be used to execute implementations of the present disclosure.

FIG. 1 depicts an example architecture 100 in accordance with implementations of the present disclosure. In the depicted example, the example architecture 100 includes one or more client devices 102, a server system 104, a network 106, and assets 110. The server system 104 includes one or more server devices and databases 108 (e.g., processors, memory). In the depicted example, a user 112 interacts with the client device 102. In an example context, the user 112 can include a user (e.g., enterprise operators, maintenance agents), who interacts with one or more a data analytics systems hosted by the server system 108.

An example data analytics system can include, without limitation, SAP Leonardo IoT provided by SAP SE of Walldorf, Germany. In the context of the present disclosure, the data analytics system connects IoT devices with people (e.g., the user 112) and processes based on real-time intelligence and enables users to understand usage patterns and drive action from insight with user-facing, digital IoT platform services and sensor data embedded in enterprise processes. In some examples, the data analytics system is deployed on the cloud (e.g., hosted on the server system 104), enriches IoT data with enterprise context, and provides an event-to-action framework for IoT integration, as well as analytical services and query models.

In some examples, the client device 102 can communicate with the server system 104 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

In accordance with the example context, the assets 110 can include entities that are monitored by an IoT network. That is, one or more IoT devices are responsive to an asset and/or an environment within which the asset is located, and generate data based thereon. For example, the assets 110 can include assets, for which predictive maintenance is to be conducted. Example assets can include, without limitation, cars, trucks, trains, planes, boats, ships, buildings, factories, or components thereof (e.g., engine, motor, compressor, HVAC unit, etc.). In some examples, an asset can include one or more sub-assets (sub-components). The terms asset and sub-asset are used inter-changeably herein. In general, an asset (and sub-asset) can include any appropriate entity, for which IoT data can be provided, and data analytics can be performed. In some examples, IoT data associated with each asset 110 is provided to the server system 104 over the network 106, which IoT data is processed in accordance with implementations of the present disclosure, as described in further detail herein.

In some implementations, data values provided by sensors associated with the assets 110 are transmitted to the server system 104 for processing in accordance with implementations of the present disclosure. In some examples, data values are transmitted in real-time, as each data value is generated. In some examples, data values are transmitted in periodic batches. In some examples, each data value is associated with a respective timestamp indicating a time, at which the data value was generated. Accordingly, the data values can be described as timeseries data. As a non-limiting example, an example format of received IoT data can be provided as:

Thing ID|Thing Type|$t_i$|$S_{value}$ where Thing ID is an identifier that uniquely identifies an IoT device that provides that data, Thing Type indicates a type of the IoT device (e.g., temperature sensor, speed sensor, humidity sensor), $t_i$ is a timestamp (e.g., indicating a time, at which data was recorded), and $S_{value}$ is a data value provided by the IoT device. It is contemplated, however, that the format can include any appropriate information (e.g., units that $S_{value}$ is measured in, a location of the IoT device at $t_i$).

In accordance with implementations of the present disclosure, and as noted above, the server system 104 hosts a data analytics system that addresses delays in IoT data and provides a process and data structure to reflect data occurrences with a start date and/or an end date. More particularly, the data analytics system includes a mechanism for hardening timespans and/or hardening timestamps to handle delays of IoT data and improve reliability of results generated based on the IoT data. Further, the data analytics system provides a highly configurable mechanism to provide segments of IoT data based on different types of timeseries data being sent to a process by detecting a start and/or an end of a segment within the timeseries data.

In some implementations, a type of the data can be provided. For example, the data can include an identifier that is indicative of a type of the data. Example identifiers can include, without limitation, a device identifier that uniquely identifies the device that generated the data, a unit identifier that identifies a unit that one or more data values are provided in (e.g., speed, temperature, cycles, weight). Example identifiers are provided above in the example format. In some implementations, a use of the data can be provided. For example, the data analytics system that receives the data can maintain information indicating an activity (e.g., generating a report) and types of data that are used in the activity. As another example, the data analytics system that receives the data can maintain information indicating one or more activities that a type of data is used in (e.g., data from device ABC is used in generating report X and report Y; data from device ABC is added to data object Z, which records historical data values of the device ABC). As described in further detail herein, whether hardening is to be applied can be determined at least partially on a type of the data and/or a use of the data.

Figure 2:
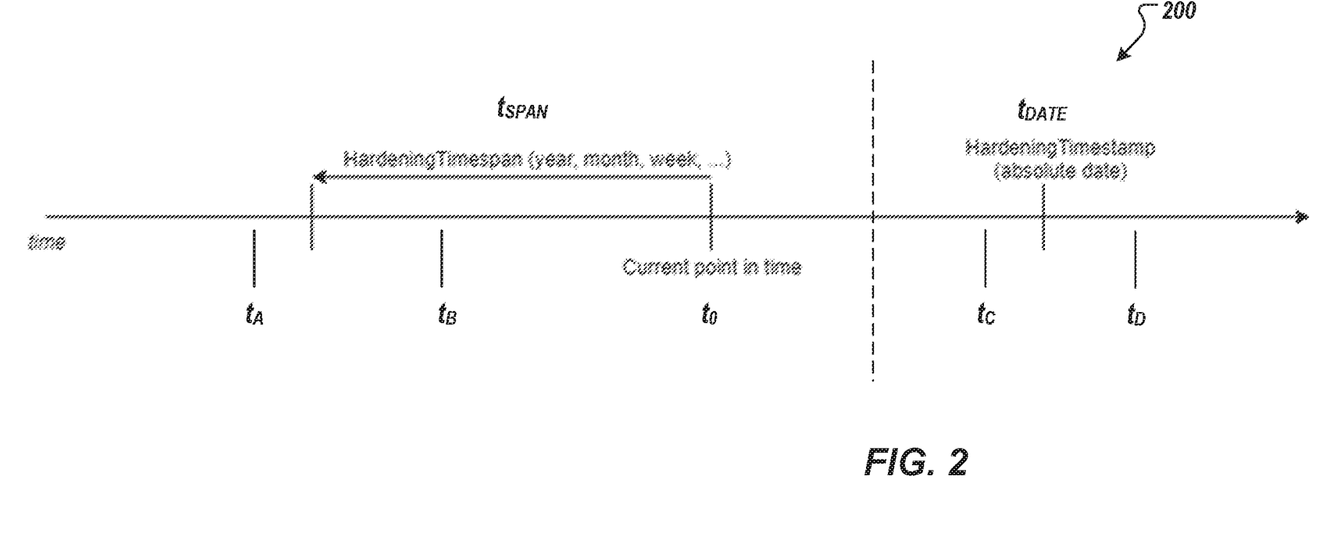
FIG. 2 provides a graphical representation depicting a difference between a hardening timespan and a hardening timestamp relative to a current point in time in accordance with implementations of the present disclosure.

As introduced above, implementations of the present disclosure provide for hardening timespans (HardeningTimespan) and/or hardening timestamps (HardeningTimestamp) to handle delays of IoT data and improve reliability of results generated based on the IoT data. FIG. 2 provides a graphical representation 200 depicting a difference between HardeningTimespan relative to a current point in time (e.g., a time to) and HardeningTimestamp.

In accordance with implementations of the present disclosure, the HardeningTimestamp is provided as an absolute date, and the HardeningTimespan is a numeric value defining a relative date (e.g., seconds, minutes, days, weeks, months, years, etc.) from a current point of time to. This relative date can be calculated by subtracting the HardeningTimespan from the current point in time. In some implementations, an IoT software component (e.g., provided by the data analytics system hosted on the server system 104) can be programmed to ignore any IoT data with a timestamp that is not valid according to the configured HardeningTimespan or HardeningTimestamp. That is, an IoT software component can be programmed to ignore any IoT data that is received at a time, the timestamp indicating the time that the IoT data is received, that is not valid according to the configured HardeningTimespan or HardeningTimestamp.

In further detail, the hardening mechanism of the present disclosure enables any IoT software processing timeseries data to handle only updates of reports or other data objects (that are based on timeseries IoT data), which are within the defined hardening criteria. This enables stakeholders (e.g., users) and other consuming software components to rely on the derived data without the risk of further changes.

With regard to HardeningTimespan, any timeseries data that is received later than the defined HardeningTimespan (i.e., with a timestamp indicating receipt later than the defined HardeningTimespan), will not be considered for calculations of higher value information. For example, and with reference to FIG. 2, an IoT platform (e.g., the data analytics system) can be configured with a HardeningTimespan of 12:00:00 (e.g., 12 hours), and receives data at a timestamp $t_A$ of 31.12.2018 10:00:00 at time to of 01.01.2019 01:00:00. In this example, the data is received outside of (e.g., is older than) the time span (e.g., is over 12 hours old). Consequently, the data will not be used in any subsequent calculations or analytics. As another example, the IoT platform (e.g., the data analytics system) receives data at a timestamp $t_B$ of 31.12.2018 23:00:00 at time to of 01.01.2019 01:00:00. In this example, the data is within of (e.g., is younger than) the time span (e.g., is less than 12 hours old). Consequently, the data will be used in subsequent calculations or analytics.

With regard to HardeningTimestamp, any timeseries data received at a timestamp that is beyond the HardeningTimestamp (e.g., the date of a specified event, such as financial closing) will not be taken into account. For example, and with continued reference to FIG. 2, an IoT platform (e.g., the data analytics system) can be configured with a HardeningTimestamp of 01.01.2019 00:00:00, and receives data at a timestamp $t_C$ (31.12.2018 23:45:00) at 31.12.2018 23:55:00. Consequently, the data will be used in subsequent calculations or analytics. As another example, the IoT platform (e.g., the data analytics system) can be configured with a HardeningTimestamp of 01.01.2019 00:00:00, and receives data at a timestamp $t_D$ (31.12.2018 23:45:00) at 01.01.2019 01:00:00. Consequently, the data will not be used in any subsequent calculations or analytics.

Figure 3:
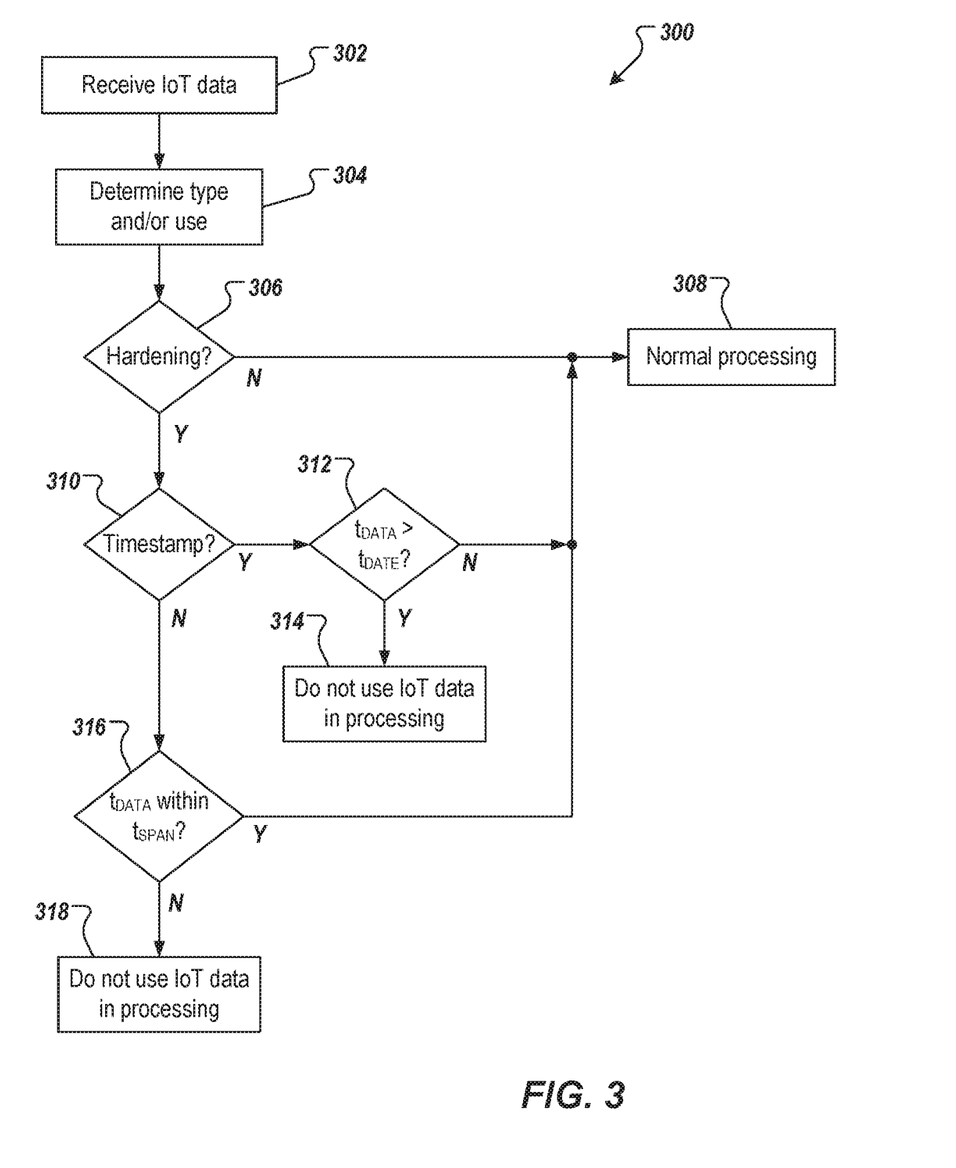
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

IoT data is received (302). For example, a data analytics system can receive IoT data from an IoT device (e.g., through an IoT gateway). In some examples, the IoT data is received in real-time (i.e., upon generation of the IoT data by the IoT device without any intentional delay). A type and/or a use of the IoT data are determined (304). For example, the data analytics system can determine a type of the IoT data and/or one or more uses of the IoT data, as described herein. It is determined whether hardening is to be applied (306). As described herein, the data analytics system can determine whether hardening is to be applied based on a type and/or use of the IoT data. For example, a particular type of IoT data and/or a particular use of IoT data can require hardening to be applied. If the IoT data that is received is of the particular type or is to be used for the particular use (e.g., generating report X), it can be determined that hardening is to be applied. If hardening is not to be applied, normal processing is performed (308). In some examples, normal processing includes processing the IoT data without applying hardening (e.g., without filtering IoT data based on HardeningTimespan or HardeningTimestamp).

If hardening is to be applied, it is determined whether the hardening is timestamp hardening (310). For example, it can be determined whether HardeningTimestamp is indicated or whether HardeningTimespan is indicated. If timestamp hardening is to be applied, a timestamp of the data ($t_{DATA}$) is compared to the hardening date ($t_{DATE}$) (312). If the timestamp of the data exceeds the hardening date, the IoT data is not used in at least a portion of subsequent processing (314). For example, for the report X, with which hardening is applied, the IoT data is not used. However, for the data object Z, the IoT data can still be used. If the timestamp of the data does not exceed the hardening date, the IoT data is used in subsequent processing (308). For example, the IoT data is used for the report X and the data object Z.

If timestamp hardening is not to be applied, timespan hardening is to be applied, and it is determined whether a timestamp of the data ($t_{DATA}$) is within a timespan ($t_{SPAN}$) (316). If the timestamp of the data is not within the timespan, the IoT data is not used in at least a portion of subsequent processing (318). For example, for the report X, with which hardening is applied, the IoT data is not used. However, for the data object Z, the IoT data can still be used. If the timestamp of the data does not exceed the hardening date, the IoT data is used in subsequent processing (308). For example, the IoT data is used for the report X and the data object Z.

As introduced above, implementations of the present disclosure also provide for provide segments of IoT data based on different types of timeseries data being sent to a process by detecting a start and/or an end of a segment within the timeseries data. More particularly, implementations of the present disclosure can be configured to detect the start of a segment and/or an end of a segment. In some examples, detection is based on a type of the timeseries data properties that are sent to a process. As described in further detail, implementations of the present disclosure provide variants in segment recognition, which include, but are not limited to: the start of a segment being determined by the first occurrence of a property and the end of the segment being defined by a gap (timespan) since data was last received; and the start of a segment being determined by a particular property value (e.g., engine on), and/or the end of a segment being determined by the occurrence of a configured property value (e.g., engine off).

In some implementations, one or more segment configurations are provided, each of which can be selectively applied to incoming IoT data to define segments within IoT data in accordance with implementations of the present disclosure. Example segment configurations can include a property-based segment configuration and property value-based segment configuration.

In some implementations, a property-based segment configuration can define a property and a timespan. In some examples, the property is a data value. In some examples, the timespan is a period of time (e.g., seconds, minutes, hours, days, weeks, months, etc.). It is contemplated that multiple property-based segment configurations can be provided. In some examples, a property-based segment configuration can be applied to particular IoT data. For example, the data analytics system can be configured to apply a first property-based segment configuration of a set of property-based segment configurations to first IoT data that is received and can be configured to apply a second property-based segment configuration of the set of property-based segment configurations to second IoT data that is received.

In applying a property-based segment configuration, incoming IoT data can be monitored and occurrence of the property can be determined (e.g., the IoT data includes the property). The first occurrence of the property can be identified as a start of a segment. The last occurrence of the property can be identified and a time can be tolled from the last occurrence of the property. In some examples, if the time exceeds the timespan provided in the property-based segment configuration without another occurrence of the property, the last occurrence of the property is identified as the end of the segment. In some examples, if the time does not exceed the timespan and the property occurs again, the segment continues to be defined until a next last occurrence of the property is evaluated. Examples of property-based segment definition is provided below.

In some implementations, a property value-based segment configuration includes a first value that indicates a start of a segment and a second value that indicates an end of the segment. It is contemplated that multiple property value-based segment configurations can be provided. In some examples, a property value-based segment configuration can be applied to particular IoT data. For example, the data analytics system can be configured to apply a first property value-based segment configuration of a set of property value-based segment configurations to first IoT data that is received and can be configured to apply a second property value-based segment configuration of the set of property value-based segment configurations to second IoT data that is received.

In applying a property value-based segment configuration, incoming IoT data can be monitored and occurrence of the first property value can be determined. The occurrence of the first property value can be identified as a start of a segment. The IoT data can continue to be monitored and occurrence of the second property value can be determined. The occurrence of the second property value can be identified as an end of the segment. An example of property-based segment definition is provided below.

Figure 4:
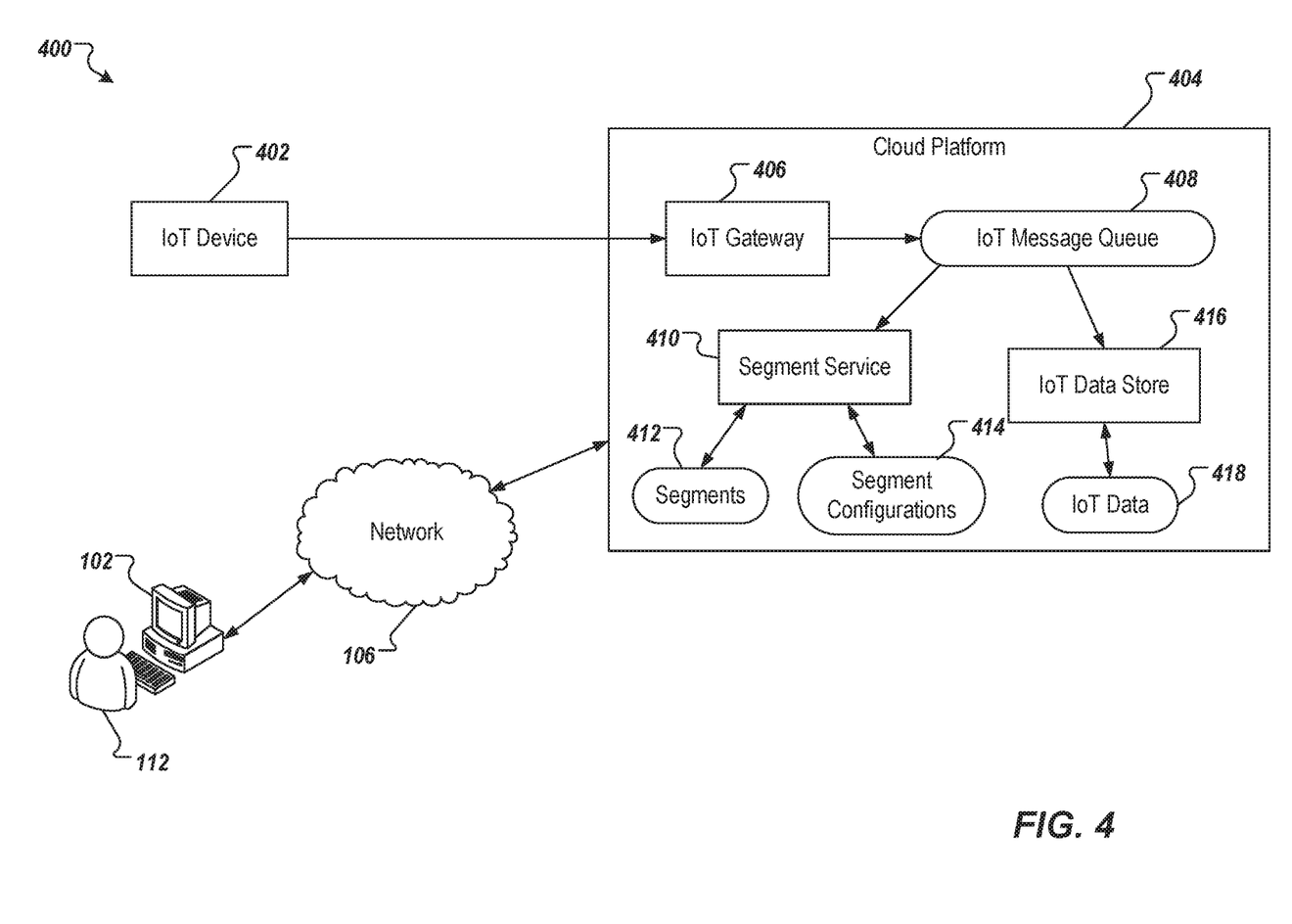
FIG. 4 depicts an example conceptual architecture in accordance with implementations of the present disclosure.

FIG. 4 depicts an example conceptual architecture 400 in accordance with implementations of the present disclosure. The example conceptual architecture 400 includes an IoT device 402 and a cloud platform 404 (e.g., hosting a data analytics system). In some examples, the user 112 uses the computing device 102 to interact with the cloud platform 404 over the network 106.

In the example of FIG. 4, the cloud platform 404 includes an IoT gateway 406, an IoT message queue 408, a segment service 410, a segment store 412, a segment configurations store 414, an IoT data storage service 416, and an IoT data store 418. In some implementations, the IoT device 402 transmits IoT data (timeseries data) to the cloud platform 404, which IoT data is received by the IoT gateway 406. The IoT gateway 406 provides the IoT data to the IoT message queue 408, which queues IoT messages that are to be sent to other components of the cloud platform 404. For example, IoT messages including at least a portion of the IoT data can be provided to the segment service 410 and/or the IoT data storage service 416 and vice-versa.

In some implementations, the segment service 410 segments the timeseries data to provide one or more segments that are stored in the segment store 412. As described herein, segmentation can be based on one or more segment configurations (e.g., property-based segment configurations, property value-based segment configurations) stored in the segment configurations store 414. As described in further detail herein, segmentation can be performed based on a property, or property values.

In some implementations, in segmenting based on a property, the segmentation process executed by the segment service 410 is configured to detect segments based on the occurrence of a type of timeseries data. By way of non-limiting example, the type of timeseries data includes global positioning system (GPS) timeseries data of a vehicle. It is contemplated, however, that any appropriate type of timeseries data can be used. In some implementations, as soon as the vehicle starts, GPS timeseries data is sent through an onboard IoT device to the segmentation process executed by the segment service 410 within the cloud platform 404. In accordance with implementations of the present disclosure, the segmentation process recognizes the first occurrence of this GPS timeseries property as the start of a segment. As soon as the vehicle stops and the IoT device does not send any GPS timeseries data for a particular time (the timespan provided in the configuration), the segmentation process recognizes this occurrence and sets the end of the segment to the last occurrence of the GPS timeseries datum.

In further detail, a property-based segment configuration can include a property of GPS and a timespan of $t_{SPAN}$. IoT data can be received and it can be determined that the IoT data includes an occurrence a GPS data. The occurrence of the GPS data is determined to be the start of a segment. For example, a timestamp of the GPS data can be provided as a time of the segment start ($t_{START}$). The IoT data can be continued to be monitored and a last occurrence of the GPS data can be determined (e.g., the GPS data stops). For example, a timestamp of the last occurrence of the GPS data can be provided as a tentative time of the segment end ($t_{TENT}$). The IoT data can continue to be monitored over $t_{SPAN}$, which begins at $t_{TENT}$. If $t_{SPAN}$ expires and there is no reoccurrence of the GPS data before expiration, $t_{TENT}$ is determined to be a time of the segment end ($t_{END}$). If, however, the GPD data reoccurs before expiration of $t_{SPAN}$, the IoT data can be continued to be monitored for a next last occurrence of the GPS data to be determined (e.g., the GPS data stops again). The process for determining whether the next last occurrence of the GPS data is the segment end is repeated.

In some implementations, in segmenting based on property value, the segmentation process executed by the segment service 410 is configured to recognize segments based on a property value. By way of non-limiting example, a vehicle can include an IoT device that is responsive to ignition status (e.g., ignition on, ignition off). In some examples, the IoT device sends the ignition status (ignition on) when starting the engine and sends the ignition status (ignition off) when turning off the engine. The segmentation process creates a segment for ignition on and completes it (e.g. determined end point in time of the segment) for receiving ignition status off. That is, the timestamp corresponding to the occurrence of the first property value (ignition on) is provided as a time of the segment start ($t_{START}$), and the timestamp corresponding to the occurrence of the second property value (ignition off) is provided as a time of the segment end ($t_{END}$).

Implementations of the present disclosure further provide a data structure for segments. In some examples, the IoT timeseries data is stored in a separate storage (e.g., the IoT data store 418), which is optimized for handling of timeseries data. In accordance with implementations of the present disclosure, the segments provided by the segment service 410 are stored in a table. In some examples, the table functions as an index and references the underlying timeseries data. Consequently, the segments need not be stored together with the raw IoT data. Instead, the segment data can be stored in a data storage that is very performant (e.g., SAP HANA). Using this mechanism, data redundancy is avoided, total cost of ownership (TCO) is reduced, and relatively very fast access to higher value information is made available.

An example table construct is provided as:

TABLE 1

Example Table Construct

| ID | Start | End | Thing ID | Config ID | State |
| --- | --- | --- | --- | --- | --- |

In some implementations, the ID is an identifier that uniquely identifies a segment. In some examples, the identifier is assigned in response to recognition of the start of a segment from the IoT data as described herein (e.g., timeseries property, timeseries property value). In some examples, Start is the start time of the segment as provided from the IoT data). In some examples, End is the end time of the segment as provided from the IoT data). In some examples, Thing ID is a unique identifier of the IoT device that generated the IoT data. In some examples, Config ID is an identifier of the segment configuration that is used to provide the segment. In some examples, State indicates a current state of the segment. Example values of State can include OPEN to indicate that the segment is in-process of being created, COMPLETED to indicate that the segment has been created, and ERROR to indicate that there was an error in creating the segment.

In accordance with implementations of the present disclosure, a segment is created whenever a segment is recognized from the incoming IoT data based on the configuration. In some examples, the segment is initially stored in the table with a unique ID assigned thereto, a start value (e.g., time at which the segment starts, as provided from the IoT data), a correlating Thing ID (e.g., a unique identifier of the IoT device), and a Config ID. Initially, the State is set to OPEN, as the segment is created. As the IoT data continues to arrive the IoT data is monitored until no new IoT data is recognized based on the configured gap in the configuration. As soon as the gap time span is exceeded, the corresponding timestamp for End is stored, and State is set to COMPLETED. In some examples, the configuration can include a minimum duration. If the duration of the segment is smaller than the minimum duration, it is removed from the table.

In some examples, a segment is configured based on one or more configuration parameters. Example parameters include, without limitation, an ID of the segment configuration, such that the different configurations are unique, a name of segment configuration, such that humans can identify a particular segment configuration, a timeseries property, such that the segmentation process knows on which property to trigger segmentation, a single thing or group of things or thing types, such that the segmentation process knows, for which thing, group of things or thing type is applicable, a minimum gap (timespan) or particular property values determining start and end (e.g. engine on/engine off). If, for example, two property values (e.g. GPS readings) occur within the minimum gap timespan, no new segment will be started but the current one will be continued. Another example parameter includes the minimum duration of segments to be recognized as segments to exclude erroneous IoT data.

Figure 5:
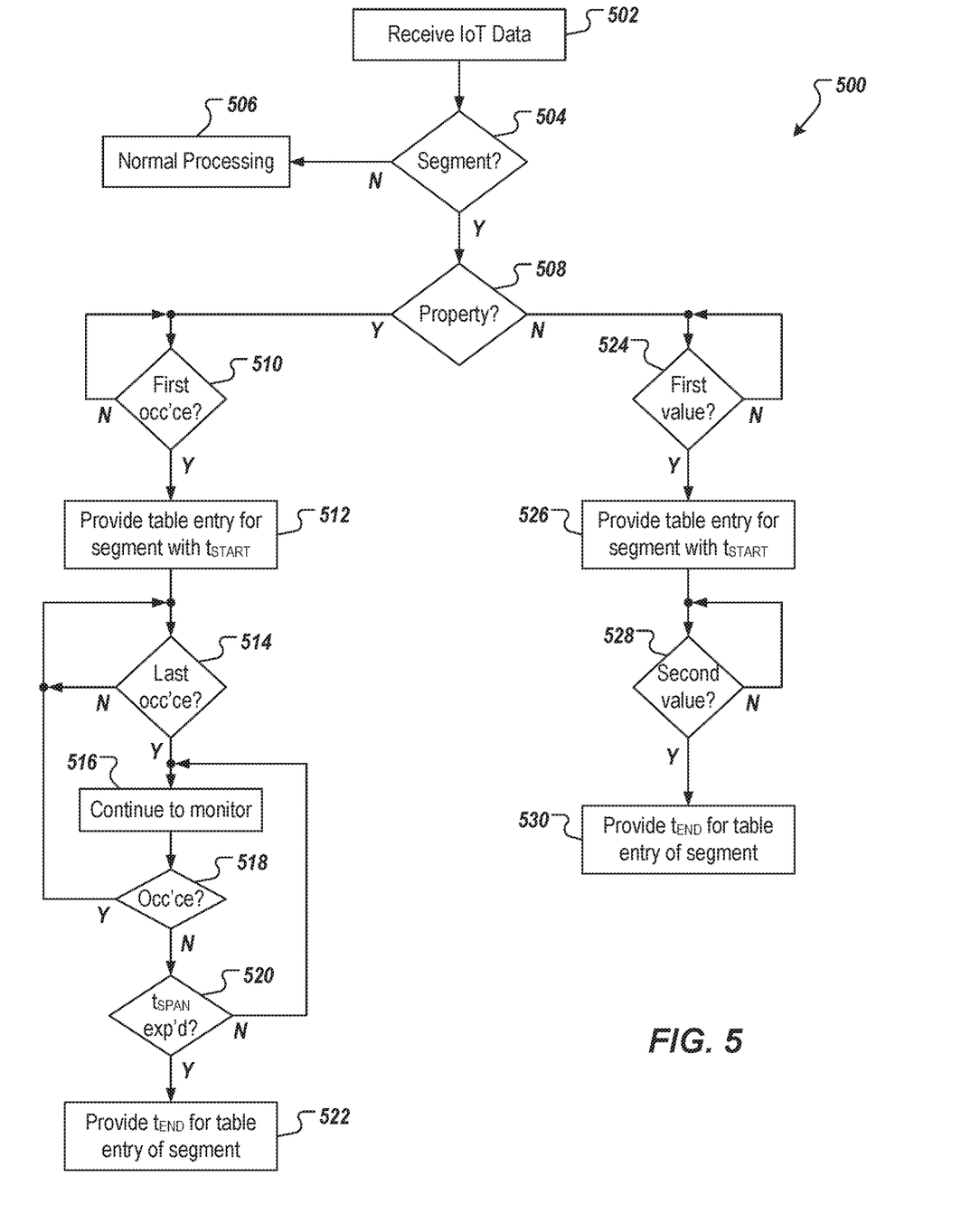
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

IoT data is received (502). For example, a data analytics system can receive IoT data from an IoT device (e.g., through an IoT gateway). In some examples, the IoT data is received in real-time (i.e., upon generation of the IoT data by the IoT device without any intentional delay).

It is determined whether segments are to be provided for the IoT data (504). For example, the data analytics system can be configured to provide segments for particular IoT data or for all IoT data received. If segments are not to be provided, normal processing is performed (506). In some examples, normal processing includes processing the IoT data without providing segments. If segments are to be provided, it is determined whether segmentation is to be based on property (508). That is, it is determined whether a property-based segment configuration is to be applied for defining segments in the IoT data. For example, the data analytics system can be configured to apply property-based segmentation of property value-based segmentation to a particular type of IoT data or to IoT data from a particular IoT device. As another example, the data analytics system can be configured to apply property-based segmentation of property value-based segmentation to IoT data that is for a particular use (e.g., for report X).

If property-based segmentation is to be applied, the IoT data is monitored as it is received, and it is determined whether a first occurrence of the property (e.g., GPS data) is received (510). If a first occurrence has not been received, the example process 500 loops back. If a first occurrence has been received, a table entry is provided for a segment and a time $t_{START}$ is provided as the timestamp of the first occurrence (512). For example, a row is created in a segment table maintained by the data analytics system, the row including cells for ID, Start, End, Thing ID, Config ID, and State, described above. In some examples, initially, an ID can be assigned to the segment, Start can be populated with $t_{START}$, Thing ID can be populated with the identifier of the IoT device providing the IoT data, Config ID can be populated with the identifier of the property-based segment configuration, and State can be populated with OPEN.

The IoT data is monitored as it is received, and it is determined whether a last occurrence of the property (e.g., GPS data) is identified (514). If a last occurrence has not been identified, the example process 500 loops back. If a last occurrence has been identified, a timer for $t_{SPAN}$ begins. The IoT data continues to be monitored as it is received (516) and it is determined whether another occurrence of the property is received (518). If another occurrence of the property is received, the example process 500 loops back to monitor for a next last occurrence. If another occurrence of the property is not received, it is determined whether $t_{SPAN}$ has expired (520). If $t_{SPAN}$ has not expired, the example process 500 loops back. If $t_{SPAN}$ has expired, a time $t_{END}$ is provided as the timestamp of the last occurrence and is input to the table entry for the segment (522). For example, End can be populated with $t_{END}$, and State can be populated with COMPLETED.

If property-based segmentation is not to be applied, property value-based segmentation is to be applied. The IoT data is monitored as it is received, and it is determined whether a first value (e.g., ignition on) is received (524). If the first value is not received, the example process 500 loops back. If the first value is received, a table entry is provided for a segment and a time $t_{START}$ is provided as the timestamp of the first value (526). For example, a row is created in a segment table maintained by the data analytics system, the row including cells for ID, Start, End, Thing ID, Config ID, and State, described above. In some examples, initially, an ID can be assigned to the segment, Start can be populated with $t_{START}$, Thing ID can be populated with the identifier of the IoT device providing the IoT data, Config ID can be populated with the identifier of the property-based segment configuration, and State can be populated with OPEN.

The IoT data continues to be monitored as it is received and it is determined whether a second value (e.g., ignition off) of the property is received (528). If the second value has not been received, the example process 500 loops back. If the second value has been received, a time $t_{END}$ is provided as the timestamp of the second value and is input to the table entry for the segment (530). For example, End can be populated with $t_{END}$ and State can be populated with COMPLETED.

Figure 6:
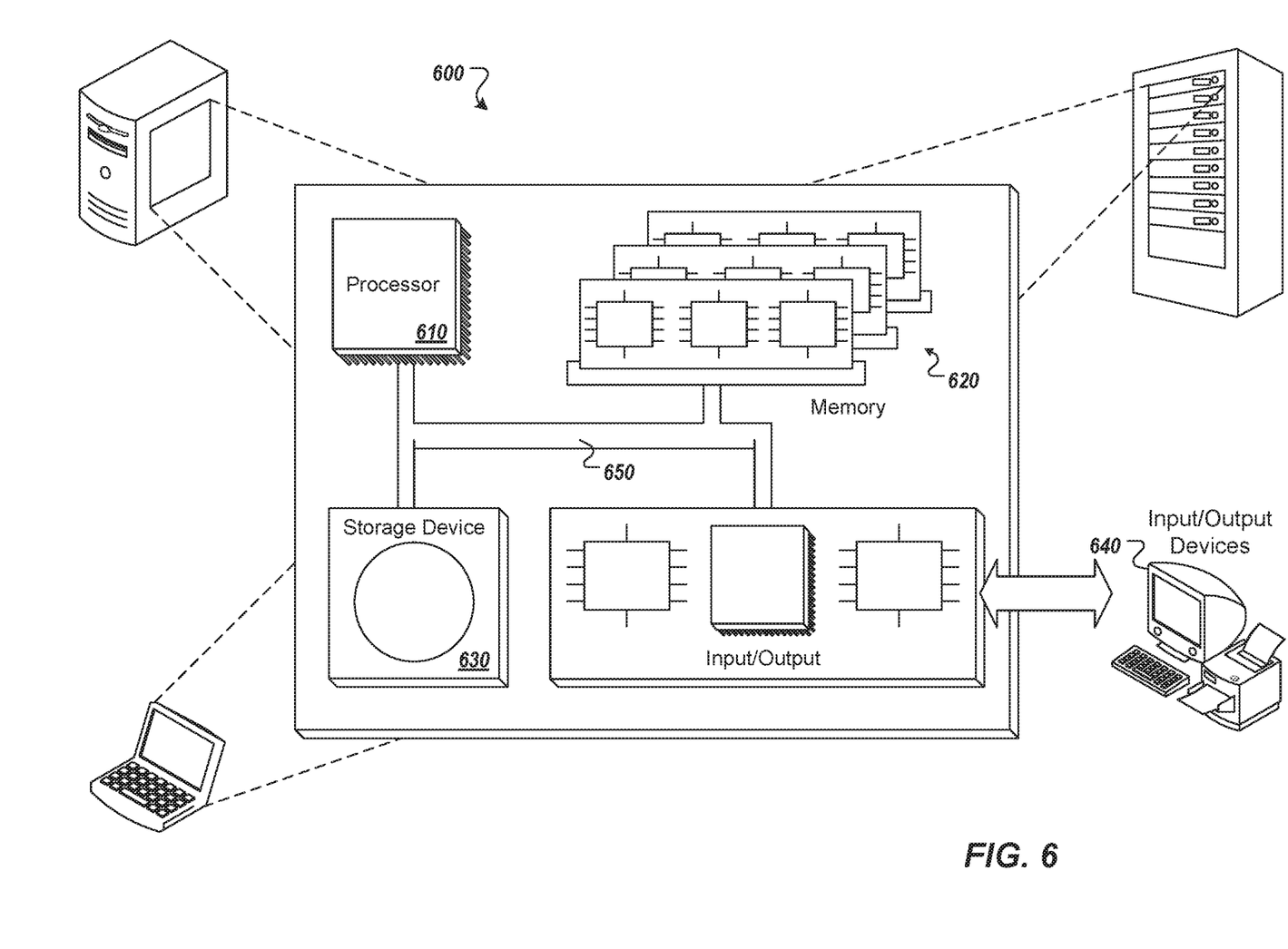
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selective use of Internet-of-Things (IoT) data in data analytics systems, the method being executed by one or more processors and comprising:
   receiving, by the data analytics system, first IoT data from a first IoT device and second IoT data from a second IoT device, the first IoT data comprising timeseries data and an identifier that uniquely identifies the first IoT device;
   determining that hardening is to be applied to the first IoT data to address any delay of the first IoT data in processing the first IoT data for analytics, and in response:
      comparing a timestamp of the first IoT data to a hardening value, the timestamp indicating when the first IoT data was generated by the first IoT device, and
      in response to comparing, selectively using the first IoT data in one or more uses by the data analytics system, the one or more uses comprising one or more of updating a report and updating a data object based on the first IoT data; and
   determining that hardening is not to be applied to the second IoT data to address any delay of the second IoT data in processing the second IoT data for analytics, and in response, processing the second IoT data without applying hardening.

2. The method of claim 1, wherein the hardening value comprises a hardening timestamp and the first IoT data is not used in the one or more uses by the data analytics system when the timestamp exceeds the hardening timestamp.

3. The method of claim 1, wherein the hardening value comprises a hardening timespan and the first IoT data is not used in the one or more uses by the data analytics system when the timestamp is not within the hardening timespan.

4. The method of claim 3, wherein the hardening timespan is relative to a current time.

5. The method of claim 1, further comprising determining one or more of a type of the first IoT data and a use of the first IoT data, wherein determining that hardening is to be applied to the first IoT data is at least partially based on one or more of the type of the first IoT data and the use of the first IoT data.

6. The method of claim 1, wherein the first IoT data is not used for at least one use and is used for another use.

7. The method of claim 1, wherein the first IoT data is received in real-time and determining that the hardening is to be applied to the first IoT data is executed in response to the receiving the first IoT data.

8. A non-transitory computer-readable storage medium coupled to one or more processors and having instructions stored thereon which, when executed by the one or more processors, cause the one or more processors to perform operations for selective use of Internet-of-Things (IoT) data in data analytics systems, the operations comprising:
   receiving, by the data analytics system, first IoT data from a first IoT device and second IoT data from a second IoT device, the first IoT data comprising timeseries data and an identifier that uniquely identifies the first IoT device;
   determining that hardening is to be applied to the first IoT data to address any delay of the first IoT data in processing the first IoT data for analytics, and in response:
      comparing a timestamp of the first IoT data to a hardening value, the timestamp indicating when the first IoT data was generated by the first IoT device, and
      in response to comparing, selectively using the first IoT data in one or more uses by the data analytics system, the one or more uses comprising one or more of updating a report and updating a data object based on the first IoT data; and
   determining that hardening is not to be applied to the second IoT data to address any delay of the second IoT data in processing the second IoT data for analytics, and in response, processing the second IoT data without applying hardening.

9. The computer-readable storage medium of claim 8, wherein the hardening value comprises a hardening timestamp and the first IoT data is not used in the one or more uses by the data analytics system when the timestamp exceeds the hardening timestamp.

10. The computer-readable storage medium of claim 8, wherein the hardening value comprises a hardening timespan and the first IoT data is not used in the one or more uses by the data analytics system when the timestamp is not within the hardening timespan.

11. The computer-readable storage medium of claim 10, wherein the hardening timespan is relative to a current time.

12. The computer-readable storage medium of claim 8, wherein operations further comprise determining one or more of a type of the first IoT data and a use of the first IoT data, wherein determining that hardening is to be applied to the first IoT data is at least partially based on one or more of the type of the first IoT data and the use of the first IoT data.

13. The computer-readable storage medium of claim 8, wherein the first IoT data is not used for at least one use and is used for another use.

14. The computer-readable storage medium of claim 8, wherein the first IoT data is received in real-time and determining that the hardening is to be applied to the first IoT data is executed in response to the receiving the first IoT data.

15. A system, comprising:
   a computing device; and
   a computer-readable storage device coupled to the computing device and having instructions stored thereon which, when executed by the computing device, cause the computing device to perform operations for selective use of Internet-of-Things (IoT) data in data analytics systems, the operations comprising:
      receiving, by the data analytics system, first IoT data from a first IoT device and second IoT data from a second IoT device, the first IoT data comprising timeseries data and an identifier that uniquely identifies the first IoT device;
      determining that hardening is to be applied to the first IoT data to address any delay of the first IoT data in processing the first IoT data for analytics, and in response:

comparing a timestamp of the first IoT data to a hardening value, the timestamp indicating when the first IoT data was generated by the first IoT device, and in response to comparing, selectively using the first IoT data in one or more uses by the data analytics system, the one or more uses comprising one or more of updating a report and updating a data object based on the first IoT data; and determining that hardening is not to be applied to the second IoT data to address any delay of the second IoT data in processing the second IoT data for analytics, and in response, processing the second IoT data without applying hardening.

16. The system of claim 15, wherein the hardening value comprises a hardening timestamp and the first IoT data is not used in the one or more uses by the data analytics system when the timestamp exceeds the hardening timestamp.

17. The system of claim 15, wherein the hardening value comprises a hardening timespan and the first IoT data is not used in the one or more uses by the data analytics system when the timestamp is not within the hardening timespan.

18. The system of claim 17, wherein the hardening timespan is relative to a current time.

19. The system of claim 15, wherein operations further comprise determining one or more of a type of the first IoT data and a use of the first IoT data, wherein determining that hardening is to be applied to the first IoT data is at least partially based on one or more of the type of the first IoT data and the use of the first IoT data.

20. The system of claim 15, wherein the first IoT data is not used for at least one use and is used for another use.

* * * * *